United States Patent
Ayame

(10) Patent No.: US 7,523,744 B2
(45) Date of Patent: Apr. 28, 2009

(54) APPARATUS AND METHOD FOR CONTROLLING AN INTERNAL COMBUSTION ENGINE

(75) Inventor: Yutaka Ayame, Zama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 98 days.

(21) Appl. No.: 11/586,813

(22) Filed: Oct. 26, 2006

(65) Prior Publication Data

US 2007/0095331 A1     May 3, 2007

(30) Foreign Application Priority Data

Oct. 27, 2005   (JP)  ............... 2005-312121
Sep. 29, 2006   (JP)  ............... 2006-266198

(51) Int. Cl.
*F02M 25/00* (2006.01)
*F02D 41/06* (2006.01)

(52) U.S. Cl. ............ 123/491; 123/179.16; 123/1 A; 701/113; 701/103

(58) Field of Classification Search ............ 123/576, 123/491, 179.16, 1 A, 494; 701/104, 112, 701/103, 113
See application file for complete search history.

(56) References Cited

U.S. PATENT DOCUMENTS 5,090,389 A * 2/1992 Oota ............... 123/685
5,170,763 A * 12/1992 Kitajima et al. ............ 123/491
5,186,149 A * 2/1993 Kitajima et al. ............ 123/491
6,997,172 B2 * 2/2006 Oshimi et al. ............ 123/685
2004/0162667 A1   8/2004   Abe et al.

FOREIGN PATENT DOCUMENTS

JP        3-54336    * 3/1991
JP      2004-293491    10/2004

* cited by examiner

*Primary Examiner*—Hai H Huynh
(74) *Attorney, Agent, or Firm*—Young Basile

(57) ABSTRACT

When an internal combustion engine controller determines that an internal combustion engine is experiencing difficulty in starting, the fuel injection amount is corrected according to a first estimated ethanol (alcohol) concentration value that is approximately in the middle concentration value between the alcohol concentration of the fuel with the highest alcohol concentration and the alcohol concentration of the fuel with the lowest alcohol concentration among the fuels that can possibly be purchased in the market. If it is determined that the engine is experiencing difficulty in starting using the corrected fuel injection amount, the fuel injection amount is corrected a second time using a second estimated alcohol concentration value different from the first estimated alcohol concentration value. As a result, the engine air-fuel ratio can be optimized when starting the engine, so that poor engine starting can be quickly overcome.

18 Claims, 2 Drawing Sheets

APPARATUS AND METHOD FOR CONTROLLING AN INTERNAL COMBUSTION ENGINE

CROSS-REFERENCE TO RELATED APPLICATION

This application claims priority from Japanese Patent Application Serial Nos. 2005-312121 filed Oct. 27, 2005 and 2006-266198 filed Sep. 29, 2006, which are incorporated herein in their entirety by reference.

TECHNICAL FIELD

The present invention pertains to an apparatus and method for controlling an internal combustion engine.

BACKGROUND

Flexible fuel vehicles (FFV) are automobiles that are capable of running on a mixture of alcohol and gasoline fuel of a variety of compositions in addition to traditional gasoline. In such FFVs, it is necessary to estimate the alcohol concentration in a given fuel and to correct the amount of fuel injected into the engine according to the estimated alcohol concentration in order to attain the same equivalent ratio.

However, because a change in the alcohol concentration in the fuel cannot be detected accurately when the engine is started immediately after the fuel is supplied, the air-fuel ratio cannot be optimized if the estimated alcohol concentration value used to correct the amount of fuel to be injected deviates from the actual alcohol concentration, resulting in the risk that the engine may not start properly.

There are known devices for setting the value of the alcohol concentration when the value is unknown following a refueling of the vehicle. For example, Japanese Kokai Patent Application No. 2004-293491 discloses a technique in which if the estimation of the alcohol concentration in the fuel is not completed at the time of starting the engine after refueling is detected, the estimated alcohol concentration value is set roughly at the middle concentration between the alcohol concentration of the commercially available fuel with the highest alcohol concentration and the alcohol concentration of the commercially available fuel with the lowest alcohol concentration, and the amount of fuel to be injected is corrected generally using the middle alcohol concentration value.

BRIEF SUMMARY OF THE INVENTION

According to embodiments of the invention, the amount of fuel to be injected into the engine is corrected according to the alcohol concentration in the fuel to aid in the starting of an internal combustion engine.

According to the teachings herein, one engine starting apparatus for starting an internal combustion engine using an alcohol-gasoline mixture fuel comprises a fuel supplying device for supplying the fuel for the engine and a controller. The controller is operable to set a first predetermined alcohol concentration value between a highest and a lowest alcohol concentration value of commercially available fuel, calculate a first fuel supply amount based on the first predetermined alcohol concentration value, perform a first engine starting operation by controlling the fuel supplying device to supply the fuel according to the first fuel supply amount, and determine whether the engine is properly started in the first engine starting operation. The controller is also operable to, if the engine is not properly started in the first engine starting operation, set a second predetermined alcohol concentration value different from the first predetermined alcohol concentration value, calculate a second fuel supply amount based on the second predetermined alcohol concentration value and perform a second engine starting operation by controlling the fuel supplying device to supply the fuel according to the second fuel supply amount.

Another example of an engine starting apparatus comprises means for setting a predetermined fuel alcohol concentration value, means for determining a fuel supply amount based on the predetermined alcohol concentration value, means for supplying the fuel supply amount to the internal combustion engine, means for starting the internal combustion engine and means for correcting the fuel supply amount based on a modified alcohol concentration if the engine does not start properly.

Methods of starting an engine are also taught herein. For example, one engine starting process for starting an internal combustion engine using an alcohol-gasoline mixture fuel comprises setting a first predetermined alcohol concentration value between the highest and the lowest alcohol concentration values of commercially available fuel, calculating a first fuel supply amount based on the first predetermined alcohol concentration value, performing a first engine starting operation by controlling the fuel supplying device to supply the fuel according to the first fuel supply amount, determining whether the engine is properly started in the first engine starting operation, setting a second predetermined alcohol concentration value different from the first predetermined alcohol concentration value if the engine is not properly started in the first engine starting operation, calculating a second fuel supply amount based on the second predetermined alcohol concentration value, and performing a second engine starting operation by controlling the fuel supplying device to supply the fuel according to the second fuel supply amount.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

For devices and methods for controlling internal combustion engines such as that described in Japanese Kokai Patent Application No. 2004-293491, the alcohol concentration at the time of starting the engine is fixed at a middle concentration value between the highest alcohol concentration and the lowest alcohol concentration of commercially available fuels. The corresponding amount of fuel to be injected is not necessarily corrected optimally. Thus, there is a possibility that poor engine starting may not be improved.

In contrast, according to embodiments of the invention, because the estimated alcohol concentration value for correcting the fuel injection amount is changed when poor starting of the engine is judged, the air-fuel ratio can be optimized when starting the engine, so that poor starting can be overcome quickly when starting the engine.

Figure 1:
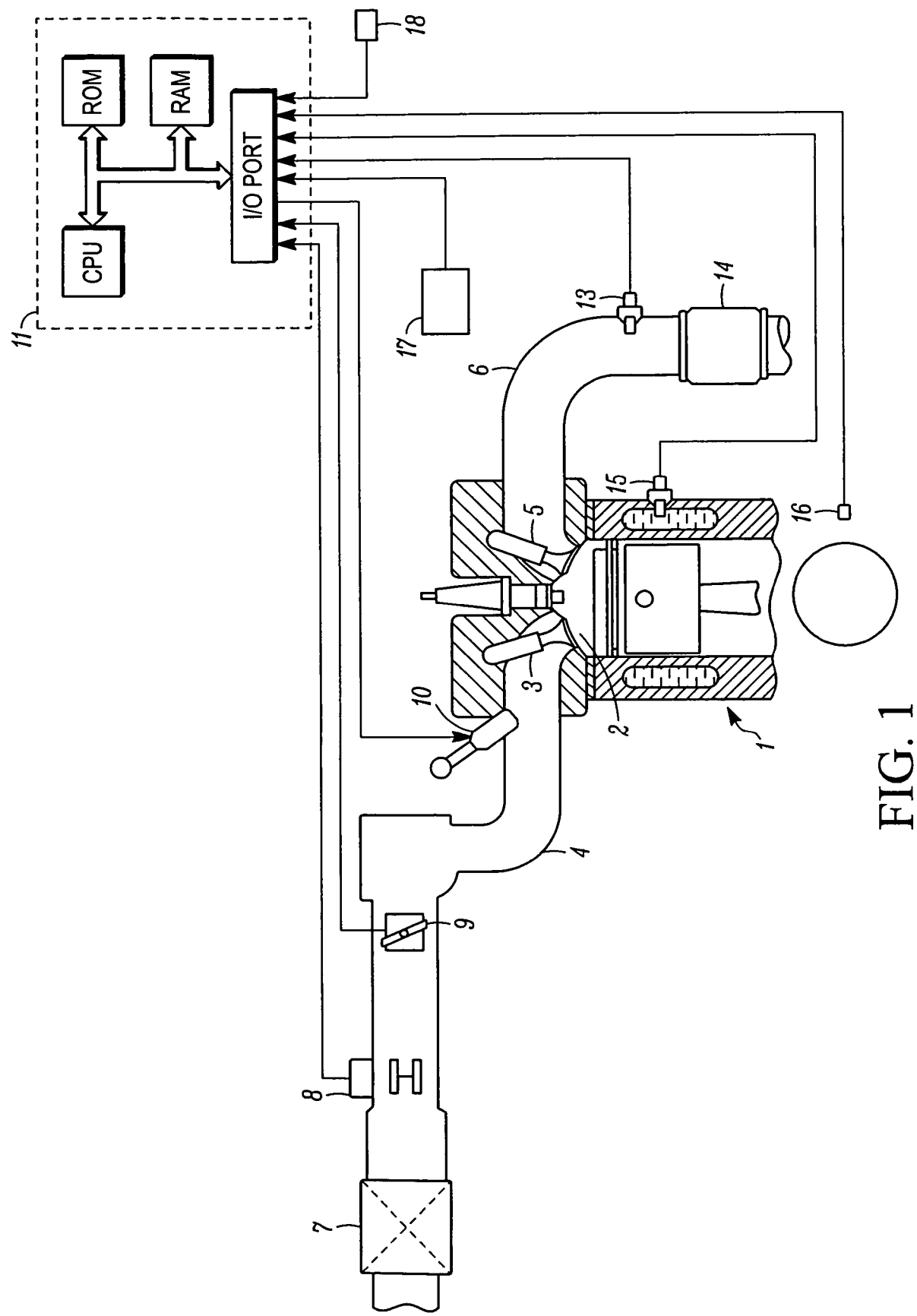
FIG. 1 is a schematic diagram showing an outline of the configuration of a controller for an internal combustion engine in an embodiment of the invention.

FIG. 1 shows a controller for an internal combustion engine pertaining to an embodiment of the invention. The internal combustion engine 1 in the present application example is installed in a flexible fuel vehicle (FFV) that is capable of running on an alcohol-gasoline mixed fuel of a variety of compositions in addition to traditional gasoline. For purposes of the disclosed embodiments, ethanol is the alcohol in the fuel.

Air intake path 4 is connected to combustion chamber 2 of engine main body 1 via air intake valve 3, and exhaust path 6 is connected to engine body 1 via exhaust valve 5.

Air cleaner 7, air flow meter 8 for detecting the amount of intake air, throttle valve 9 for regulating the amount of intake air, and fuel injection valve 10 for injecting the fuel into the intake air are provided on air intake path 4.

Fuel injection valve 10 injects the fuel into the intake air so as to attain a prescribed air-fuel ratio suitable for a given running condition according to an injection command signal from engine controller unit 11 (denoted as ECU hereinafter). The ECU 11 is a standard engine microcontroller that includes a central processing unit (CPU), random access memory (RAM), read only memory (ROM) and an input/output port (I/O port) receiving input signals and sending the injection command signal to the fuel injection valve 10 as discussed in more detail below. The programming described herein is generally stored in memory and is performed by the logic of the CPU. Of course, the controller that performs the programming described herein could also be part of a dedicated microcontroller or could be a microprocessor using external memory.

Air-fuel ratio sensor 13, serving as an air-fuel ratio detection means that detects the exhaust air-fuel ratio in the exhaust gas, and three-way catalyst 14 are provided on exhaust path 6.

Because three-way catalyst 14 is capable of cleaning NOx, HC, and CO in the exhaust gas simultaneously at the highest conversion efficiency when the air-fuel ratio is within a so-called window around a logical air-fuel ratio, ECU 11 performs air-fuel ratio feedback control in such a manner that the exhaust air-fuel ratio can oscillate at a fixed cycle within the range of the window based on the output from air-fuel ratio sensor 13 provided upstream from three-way catalyst 14.

Signals from water temperature sensor 15 that detects the temperature of the water for cooling engine main body 1, crank angle sensor 16 that detects the rpm of the engine, and fuel level gauge sensor 17 that detects the fuel level in the fuel tank (not shown) are input to ECU 11.

In addition, ECU 11 monitors whether the starter motor is driven through engine key operation by the driver based on ON-OFF signals (starter motor driven when ON, and starter motor stopped when OFF) from starter motor switch (starter switch) 18.

In the present embodiment, the ethanol concentration is estimated as the alcohol concentration in the fuel. Because the ethanol concentration in the fuel is proportional to the amount (air-fuel ratio deviation amount) that the exhaust air-fuel ratio detected by air-fuel ratio sensor 13 deviates from a given target air-fuel ratio once air-fuel ratio sensor 13 is activated when the engine is warmed up, it is computed using a map prestored in a ROM provided inside ECU 11 and stored in ECU 11 while it is updated continuously. Then, the amount of fuel to be injected is computed based on the stored ethanol concentration. Additional details of the estimation of the fuel qualities are contained in U.S. Pat. Pub. No. 2004/0162667 A1, which is incorporated herein in its entirety by reference.

Figure 2:
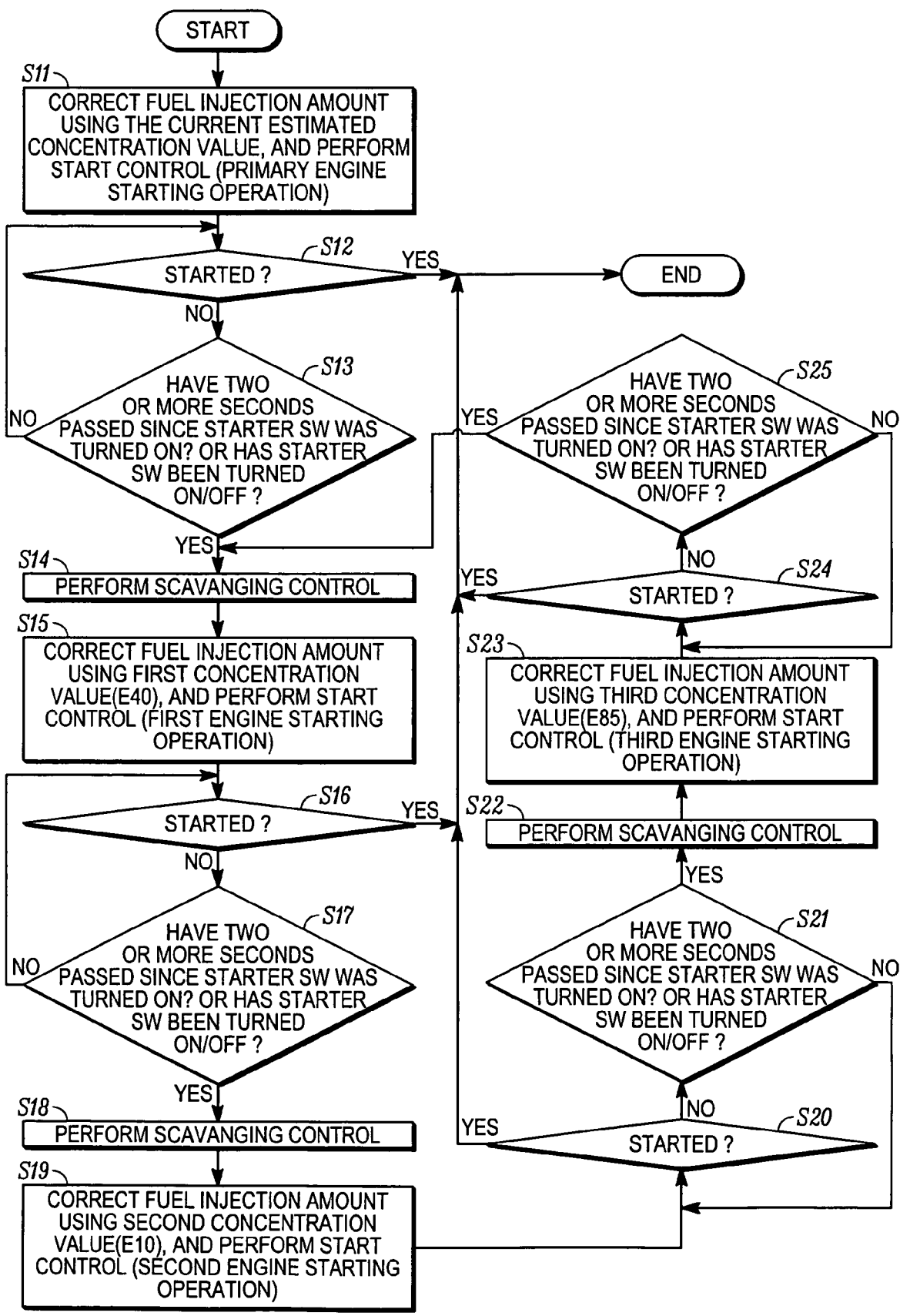
FIG. 2 is a flow chart showing the control flow of a controller for an internal combustion engine in an embodiment of the invention.

On the other hand, when air-fuel ratio sensor 13 is not yet activated when the engine is just started, for example, as shown in FIG. 2, the ethanol concentration in the fuel is estimated temporarily in order to optimize the fuel injection amount.

In step (denoted as S hereinafter) 11, the fuel injection amount is corrected using the current estimated ethanol concentration value stored in ECU 11. A primary engine start control operation (cranking by a starter motor and injection of the fuel) is initiated based on the corrected fuel injection amount.

In S12, following the primary engine starting operation, whether the engine has been started is determined by ECU 11. In the ECU 11 for an internal combustion engine described, the ECU 11 determines that the internal combustion engine is experiencing difficulty in starting when, for example, it is taking longer than a prescribed amount of time to start the internal combustion engine. Alternately, the ECU 11 determines that the internal combustion engine is experiencing difficulty in starting when starting of the internal combustion engine is attempted more than a prescribed number of times without properly starting. If the engine has not been started properly, advancement is made to S13. On the other hand, if the engine has been started properly, it is assumed that the ethanol concentration in the fuel matches the current estimated ethanol concentration value stored in ECU 11, and the fuel injection amount is corrected using the stored currently estimated ethanol concentration value until air-fuel ratio sensor 13 is activated.

In S13, when two or more seconds have passed after starter motor switch 18 was turned ON, or when starter motor switch 18 is turned ON/OFF, a determination is made by ECU 11 that the engine is experiencing difficulty in starting (it has not started or not started appropriately) because the current estimated alcohol concentration value is inappropriate, and advance is made to S14. Otherwise, the process returns to S12.

In this embodiment, when the ECU 11 determines that the engine has not started properly in S13, a scavenging operation is initiated by the ECU 11 in S14. More specifically, in S14, the injection of the fuel is stopped and a scavenging operation is performed by cranking the engine without injecting additional fuel before advancing to S15. Here, fuel adhered to spark plugs is blown away during this scavenging control, so that so-called excess injection that is responsible for poor ignition of the plugs due to the adhesion of fuel to the spark plugs can be prevented.

In S15, when the engine has not started appropriately during the primary engine starting operation based on the stored current estimated ethanol concentration value, the fuel injection amount is corrected using a first estimated ethanol concentration value (first alcohol concentration value), which involves a 40% ethanol concentration (alcohol concentration) in the fuel, instead of using the estimated current ethanol concentration value stored in ECU 11. An engine start control is performed based on the corrected fuel injection amount based on the first alcohol concentration value. That is, the first estimated ethanol (alcohol) concentration value is set at a value close to the middle concentration between the alcohol concentration of the fuel with the highest alcohol concentration (so-called E85 fuel with an 85% ethanol concentration) and the alcohol concentration of the fuel with the lowest alcohol concentration (E0 fuel with a 0% ethanol concentration, i.e., traditional or ordinary gasoline) among the fuels that can possibly be purchased in the commercial market.

In one embodiment, as described above, an ethanol concentration of 40% is set (that is, equivalent to E40 fuel). When a 40% ethanol concentration is set, the fuel injection amount is approximately 118% compared to the case where the ethanol concentration is 0% (ordinary gasoline).

In S16, following the first engine starting operation, whether the engine has started is determined by ECU 11 as previously described. If the engine has not started, advancement is made to S17. On the other hand, if the engine has started, it is assumed that the ethanol concentration in the fuel roughly matches the first estimated ethanol concentration value, and the fuel injection amount is corrected using the first estimated ethanol concentration value until air-fuel ratio sensor 13 is activated.

In S17, when two or more seconds have passed after starter motor switch 18 was turned ON, or when starter motor switch 18 is turned ON/OFF, a determination is made by ECU 11 that the engine is experiencing difficulty in starting (it has not started appropriately) because the first estimated alcohol concentration value is inappropriate, and processing advances to S18. Otherwise, the process returns to S16.

In S18, the same scavenging operation described in S14 above is performed before advancing to S19.

In this described embodiment of the invention, when poor starting of the internal combustion engine is detected by the ECU 11 using the fuel injection amount corrected using a first alcohol concentration value, the fuel injection amount is corrected using the second alcohol concentration value that corresponds to a fuel with an alcohol concentration lower than the first estimated alcohol concentration value among the fuels that can possibly be purchased in the market. As a result, the air-fuel ratio can be adjusted more appropriately when starting the engine while restraining so-called excess injection. In S19, because it is extrapolated that the fuel injected has a low ethanol concentration, the fuel injection amount is corrected using a second estimated ethanol concentration value (second concentration value) that is lower than the first concentration value, for example, a 10% ethanol concentration (alcohol concentration) in the fuel instead of using the first alcohol concentration value. A second engine start operation is performed based on the corrected fuel injection amount. When a 10% ethanol concentration is set, the fuel injection amount is approximately 105% compared to the case where the ethanol concentration is 0% (ordinary gasoline).

In S20, following the second engine starting operation, whether the engine has started is determined by ECU 11 as previously described. If the engine has not started properly, advancement is made to S21. On the other hand, if the engine has started, it is assumed that the ethanol concentration in the fuel roughly matches the second estimated ethanol concentration value, and the fuel injection amount is corrected using the second estimated ethanol concentration value until air-fuel ratio sensor 13 is activated.

In S21, when two or more seconds have passed after starter motor switch 18 was turned ON, or when starter motor switch 18 is turned ON/OFF, a determination is made by ECU 11 that the engine is experiencing difficulty in starting (it has not started appropriately) because the second estimated alcohol concentration value is inappropriate, and processing advances to S22. Otherwise, the process returns to S20.

In S22, the same scavenging operation described in S14 above is performed before advancing to S23.

In this described embodiment of the invention, when the ECU 11 determines that poor starting of the engine has occurred using the second alcohol concentration value, the fuel injection amount is corrected using a third alcohol concentration value that corresponds to a fuel with an alcohol concentration higher than the first estimated alcohol concentration value among the fuels that can possibly be purchased in the market. In S23, because it is extrapolated that the fuel injected has a high ethanol concentration, the fuel injection amount is corrected using a third ethanol concentration value (third concentration value) higher than the first alcohol concentration value, for example, an 85% (E85) ethanol concentration (alcohol concentration) in the fuel instead of using the second estimated ethanol concentration value. An engine start control is performed based on the corrected fuel injection amount. When an 85% ethanol concentration is set, the fuel injection amount is approximately 140% compared to the case where the ethanol concentration is 0% (ordinary gasoline).

In S24, following the third engine start operation, whether the engine has started is determined by ECU 11 as previously described. If the engine has not started, advancement is made to S25. On the other hand, if the engine has started, it is assumed that the ethanol concentration in the fuel roughly matches the third estimated ethanol concentration value, and the fuel injection amount is corrected using the third estimated ethanol concentration value until air-fuel ratio sensor 13 is activated.

In S25, when two or more seconds have passed after starter motor switch 18 was turned ON, or when starter motor switch 18 is turned ON/OFF, a determination is made by ECU 11 that the engine is experiencing difficulty in starting (it has not started appropriately) because the third estimated alcohol concentration value is inappropriate. In this instance, attempts are made to overcome the poor engine starting status by changing the estimated ethanol concentration value upon returning to S14.

Here, in the determination of whether the engine has started in S12, S16, S20 or S24, a determination is made that the engine has started (YES) when, for example, the rpm of the engine has exceeded 1000 at first idle.

As explained above, because the estimated ethanol concentration value for correcting the fuel injection amount is changed when poor engine starting is detected when starting the engine, even if the estimated ethanol concentration value is different from the actual ethanol concentration in the fuel, the air-fuel ratio can be optimized when starting the engine, so that poor engine starting can be overcome quickly when starting the engine.

In addition, when poor engine starting is detected when the first estimated ethanol concentration value is used, the fuel injection amount is corrected using the second estimated ethanol concentration value, for example, (E10) which is thinner than the first estimated ethanol concentration value, for example, (E40). Thus, the fuel injection amount is reduced, and the air-fuel ratio can be adjusted more appropriately when starting the engine while restraining so-called excess injection.

Then, because the scavenging operation is performed when poor engine starting is detected when starting the engine, the air-fuel ratio can be adjusted more appropriately by changing the estimated ethanol concentration value without an effect from excess injection.

Furthermore, although the first estimated ethanol concentration value was E40 in the aforementioned embodiment, the first alcohol concentration is not restricted to E40, and it may be, for example, E60 or lower number. In addition, the second estimated ethanol concentration value is not restricted to E10. The second concentration may be higher or lower than the disclosed first estimated ethanol concentration value, for example, a value such as E20 or E0. The third estimated ethanol concentration value is further not restricted to E85.

Any ethanol concentration value greater than the first estimated ethanol concentration value, for example, a value such as E80, may be used.

The above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. An engine starting apparatus for starting an internal combustion engine, the engine using an alcohol-gasoline mixture fuel, the apparatus comprising:

a fuel supplying device for supplying the fuel for the engine; and a controller operable to:

set a first predetermined alcohol concentration value between a highest and a lowest alcohol concentration value of commercially available fuel;

calculate a first fuel supply amount based on the first predetermined alcohol concentration value;

perform a first engine starting operation by controlling the fuel supplying device to supply the fuel according to the first fuel supply amount;

determine whether the engine is properly started in the first engine starting operation;

set a second predetermined alcohol concentration value different from the first predetermined alcohol concentration value if the engine is not properly started in the first engine starting operation;

calculate a second fuel supply amount based on the second predetermined alcohol concentration value;

perform a second engine starting operation by controlling the fuel supplying device to supply the fuel according to the second fuel supply amount; and perform a scavenging operation to discharge remaining fuel from a combustion chamber of the engine prior to performing a subsequent engine starting operation when the engine is not properly started in a prior engine starting operation.

2. The engine starting apparatus of claim 1 wherein the second predetermined alcohol concentration value is lower than the first predetermined alcohol concentration value and higher than the lowest alcohol concentration value of commercially available fuel.

3. The engine starting apparatus of claim 1 wherein the controller is further operable to:

determine whether the engine is properly started in the second engine starting operation;

set a third predetermined alcohol concentration value higher than the first predetermined alcohol concentration value and lower than the highest alcohol concentration value of commercially available fuel if the engine is not properly started in the second engine starting operation;

calculate a third fuel supply amount based on the third predetermined alcohol concentration value; and perform a third engine starting operation by controlling the fuel supplying device to supply the fuel according to the third fuel supply amount.

4. The engine starting apparatus of claim 1 wherein the controller is further operable to:

calculate a primary fuel supply amount based on a current estimated alcohol concentration value in the fuel prior to setting the first predetermined alcohol concentration value;

perform a primary engine starting operation prior to setting the first predetermined alcohol concentration value by controlling the fuel supplying device to supply the fuel according to the primary fuel supply amount;

determine whether the engine is properly started in the primary engine starting operation; and initiate the setting of the first predetermined alcohol concentration value when the engine is not properly started in the primary engine starting operation.

5. The engine starting apparatus of claim 4 wherein the apparatus further comprises an air-fuel ratio detecting device operable to detect the air-fuel ratio of the engine, and wherein the controller is further operable to estimate an alcohol concentration of the fuel based on the air-fuel ratio detected by the air-fuel ratio detecting device when the air-fuel ratio detecting device is activated and is operable to store the estimated alcohol concentration value in the controller as the current estimated alcohol concentration value.

6. The engine starting apparatus of claim 5 wherein the current estimated alcohol concentration value is the most recent value stored in the controller.

7. The engine starting apparatus of claim 1 wherein the controller is operable to determine that the engine is not properly started in the first engine starting operation when a predetermined time elapses during the first engine starting operation.

8. The engine starting apparatus of claim 1 wherein the controller is operable to determine that the engine is not properly started in the first engine starting operation when the first engine starting operation is repeated a predetermined number of times.

9. The engine starting apparatus of claim 1 wherein the scavenging operation is performed by cranking the engine without supplying fuel.

10. An engine starting apparatus for starting an internal combustion engine using an alcohol-gasoline mixture fuel, the apparatus comprising:

means for setting a predetermined fuel alcohol concentration value;

means for determining a fuel supply amount based on the predetermined alcohol concentration value;

means for supplying the fuel supply amount to the internal combustion engine;

means for starting the internal combustion engine; and means for correcting the fuel supply amount based on a modified alcohol concentration if the engine does not start properly; and means for performing a scavenging operation to discharge remaining fuel from a combustion chamber of the engine prior to performing a subsequent engine starting operation when the engine is not properly started in a prior engine starting operation.

11. An engine starting process for starting an internal combustion engine, the engine using an alcohol-gasoline mixture fuel, the process comprising:

setting a first predetermined alcohol concentration value between the highest and the lowest alcohol concentration values of commercially available fuel;

calculating a first fuel supply amount based on the first predetermined alcohol concentration value;

performing a first engine starting operation by controlling the fuel supplying device to supply the fuel according to the first fuel supply amount;

determining whether the engine is properly started in the first engine starting operation;

setting a second predetermined alcohol concentration value different from the first predetermined alcohol concentration value if the engine is not properly started in the first engine starting operation;

calculating a second fuel supply amount based on the second predetermined alcohol concentration value;

performing a second engine starting operation by controlling the fuel supplying device to supply the fuel according to the second fuel supply amount; and performing a scavenging operation to discharge remaining fuel from a combustion chamber of the engine prior to performing the second engine starting operation when the engine is not properly started in the first engine starting operation.

12. The engine starting process of claim 11 wherein the first predetermined alcohol concentration value is a value approximately in the middle between the highest and lowest alcohol concentration values.

13. The engine starting process of claim 11 wherein the second predetermined alcohol concentration value is lower than the first predetermined alcohol concentration value and higher than the lowest alcohol concentration value of the commercially available fuel.

14. The engine starting process of claim 13, further comprising:

determining whether the engine is properly started in the second engine starting operation;

setting a third predetermined alcohol concentration value different from the first predetermined alcohol concentration value and different from the second predetermined alcohol concentration value if the engine is not started properly in the second engine starting operation;

calculating a third fuel supply amount based on the third alcohol predetermined alcohol concentration value; and performing a third engine starting operation by controlling the fuel supplying device to supply the fuel according to the third fuel supply amount.

15. The engine starting process of claim 14, wherein the third predetermined alcohol concentration value is higher than the first predetermined alcohol concentration value and lower than the highest alcohol concentration value of the commercially available fuel.

16. The engine starting process of claim 11, further comprising:

determining whether the engine is properly started in the second engine starting operation;

setting a third predetermined alcohol concentration value different from the first predetermined alcohol concentration value and different from the second predetermined alcohol concentration value if the engine is not started properly in the second engine starting operation;

calculating a third fuel supply amount based on the third alcohol predetermined alcohol concentration value; and performing a third engine starting operation by controlling the fuel supplying device to supply the fuel according to the third fuel supply amount.

17. The engine starting process of claim 11, further comprising:

detecting an air-fuel ratio;

calculating an estimated alcohol concentration in the fuel based on the detected air-fuel ratio;

storing the estimated alcohol concentration in a controller as a current estimated alcohol concentration value; and performing a primary engine starting operation based on the current estimated alcohol concentration value.

18. The engine starting process of claim 11 wherein determining whether the engine is properly started in at least one of the first and the second engine starting operations further comprises at least one of determining whether a predetermined time elapses during the at least one of the first and the second engine starting operations and whether the at least one of the first and the second engine starting operation is repeated a predetermined number of times.

* * * * *